Patented May 30, 1933

1,912,073

UNITED STATES PATENT OFFICE

ALBERT F. O. GERMANN, OF CLEVELAND, OHIO, ASSIGNOR TO S. M. A. CORPORATION, OF CLEVELAND, OHIO, A CORPORATION OF OHIO

PROCESS FOR PRESERVING MILK PRODUCTS

No Drawing. Application filed May 6, 1931. Serial No. 535,557.

This invention relates to a process for preserving milk products and especially cream, its object being to provide an improved method which produces a smooth palatable and sterile cream which keeps well, even in warm weather, which is particularly resistant to feathering in hot coffee, which is especially nutritious as compared with fresh cream by reason of its higher milk protein content, which is not likely to curdle or coagulate either during preparation or on standing, and in which the butter fat is so finely divided and disseminated that the resulting emulsion is substantially permanent over long periods of time.

It is, of course, well known that ordinary cream separated from milk by ordinary methods, such as by a cream separator, can be hermetically sealed in cans, sterilized and preserved, like evaporated milk, but the product is objectionable because on standing the butter fat particles have a tendency to rise to the top and form a "cream plug" which is difficult to thereafter mix with the remaining contents of the can. It is also known that such difficulty may be overcome by homogenization, to wit, a process of forcing the material through small openings under high pressure, to break up the fat particles, a process which may be performed in one or several stages and which produces a more or less stable emulsion. However, when such process is applied to cream and the latter is sterilized, it is found that the cream will not take the heat, but coagulates or curdles during sterilization. True, at certain times of the year sterilization may be accomplished without curdling, but this is the exception and not the rule and is therefore not dependable. Also, instability of cream toward heat is accompanied by a tendency of the product to feather when mixed with hot coffee, so that a homogenized cream which will take a heat treatment will nevertheless feather.

Some attempts to increase the stability of cream toward heat have taken the course of increasing the milk solids not fat, as in the United States patents to Fenlon 1,483,422, February 12, 1924 and 1,526,780, February 17, 1925; and Frohring 1,609,617, December 7, 1926, from which patents and experience in practice it appears that milk protein, in the form of milk solids not fat or caseinates, may be relied upon to improve the ability of milk products, such as homogenized cream, to withstand necessary sterilizing temperatures but all such methods of accomplishing the end involve controlled changes in the composition of the cream, such as the removal of water by evaporation, the addition of milk solids not fat in the form of desiccated milk powder, the addition of caseinates or some form of soluble casein or the like. Evidence is also at hand (Fundamentals of Dairy Science by associates of L. A. Rogers, page 144) to prove that the dispersed fat of milk products is protected by an adsorbed protein film. Obviously, the amount of protein necessary for the purpose depends upon the total surface to be protected. Wiegner, Kolloid Zeitschrift, 15, 105 (1914), calculates that in normal fresh milk 2% of the protein present is contained in the protective film adsorbed on the surface of the fat globules. He has also shown that homogenization of milk containing fat globules having an average diameter of 2.90 m$\mu$ reduces the size to a diameter of 0.27 m$\mu$, increases the number of globules 20 times, their total surface 117 times, and the amount of adsorbed protein to 25% of that present in the milk. It therefore is not surprising that the removal of so much buffering material from the milk serum to the surface of the fat globules destroys stability of the system, when it is remembered that the proteins of milk are the most important buffers present.

Using the figures advanced by Wiegner as above, the following calculation is readily made:

If 300 lbs. of whole fresh milk containing 3.3% protein and 5% of butter fat are centrifuged in a cream separator, 60 lbs. of 25% cream are obtained. Making allowances for the volume of the fat and the protein adsorbed on its surface, the protein content of the skim milk fraction is approximately 3.4%. Since the cream is three-fourths skim milk and one-fourth butter fat, and making allowance for the protein adsorbed on the surface of the fat, the protein content of the cream fraction is approximately 2.88%. Homogenization of the original milk enlarges the surface of the fat particles to such an extent that 25% of the protein instead of 2% is adsorbed. That is to say, for 300 lbs. of milk containing 9.9 lbs. protein, 2% of the latter or 0.198 lb. of protein is adsorbed before homogenization, and 25% or 2.47 lbs. of protein is adsorbed after homogenization.

Now, if the cream, instead of the milk, is homogenized, the fat surface to be protected by a protein film is the same as before, and the tendency is to adsorb 2.47 lbs. of protein, but the total protein content of the cream is only 1.73 lbs. (2.88% of 60 lbs.). Hence there is a deficiency of protein if an attempt is made to homogenize the cream. The fat particles thereof are consequently incompletely protected by protein film, and after the establishment of equilibrium, only a relatively small amount of free protein is left unadsorbed.

The incomplete protection of the fat particles, and the low amount of free protein present probably are together responsible for low heat stability of homogenized cream and for the tendency of such cream to feather in hot coffee. With reference to the latter tendency, it may be assumed that unusually small amounts of precipitating agents, such as acids and calcium and magnesium salts, may upset stability of the solution and cause feathering. Since the coagulation of milk or cream is accelerated by the application of heat, the same applies to heat stability as well as to feathering.

From the theoretical point of view, therefore, it may be readily appreciated that the removal of water by evaporation, the addition of milk solids not fat, or the addition of soluble milk protein in the form of caseinates or some soluble form of casein to a homogenized cream, all have the same effect, to wit, the available milk protein is increased relative to the amount of fat present, so that on the one hand the fat emulsion is stabilized, and on the other hand more buffering material is supplied to overcome the effect of acidity and the tendency of calcium and magnesium or other salts to reduce the heat stability.

According to my invention, I provide a process of preserving cream involving sterilization by subjecting the milk product to homogenization at a time or stage of the process during which there is a large supply or proportion of natural milk protein present, sufficient not only to permit the fat globules to adsorb the necessary and maximum amount of protein, but even in excess thereof. More specifically, I subject fresh whole milk to homogenization before the fat is separated therefrom, and either before or after the usual moderate heat treatment of pasteurization, after which the homogenized milk is subjected to a separating process, such as to centrifuging in a high speed cream separator, to separate the cream. The cream so obtained is then further treated and standardized to yield a cream having any desired or predetermined fat content, for example, 18%, 25% or any other desired value, and is hermetically sealed into cans and sterilized according to any practical method.

The object of such treatment is to carry out the step of homogenization in the presence of a large supply of natural milk protein so that the fat globules during and after their reduction in size to very minute form, can adsorb the necessary and maximum amount of protein before the fat globules are separated as cream. The result is to recover a cream containing a higher protein content than is otherwise possible, but nevertheless without any necessity of adding protein as milk solids not fat or in the form of caseinates or some soluble form of casein.

In the example cited above, the theoretical protein content of a 25% cream prepared in this way is about 5.0%. In actual practice this limit may never be reached, due to various practical limiting factors which may vary with conditions. For example, the ordinary cream separators now available may not be sufficiently efficient in the separation of small fat particles, so that with present cream separating equipment homogenization may not be possible at very high pressures, such as would secure the smallest fat particles, but only at relatively low pressures, such as 500 lbs. to 1000 lbs., which would result in the recovery of creams having lower protein content than the 5% referred to. Again, operation under the higher homogenizing pressures of several thousand pounds may involve some loss of cream with the skim milk, unless the skim milk containing fat might find a profitable use. For this reason, it may be desirable to carry out homogenization in one or two stages, such as a first stage of homogenization at a low pressure, say 500 lbs. to 1000 lbs., depending upon the desirable size of the fat globules, applied to the fresh whole milk, with a subsequent homogenization at a higher pressure, say 2000 lbs., after the cream is separated. The particular pressures given are not intended in any limiting sense but merely as examples, because higher or lower pressures may be used.

As a practical example of my method, let it be required to produce a 25% cream from fresh milk having a butter content of 5%. The fresh milk is first pasteurized by any standard method, and either while still hot or after cooling, is put through a homogenizer at a pressure of say 500 lbs, to 1000 lbs., or pasteurization may occur after homogenization. The homogenized milk is now separated into cream and skim milk by a suitable cream separator and the effluent cream is standardized to a desirable butter fat content, say 25%. Because of the low homogenizing pressure applied to the milk before cream separation, the cream after separation may be again homogenized at say 2000 lbs. pressure, and it is then cooled. The second homogenization may occur before standardization to the desired butter fat content. The homogenized cream is now tested with reference to its ability to withstand sterilizing temperatures, and a sterilizing temperature is selected satisfactory for the purpose. As in the case of evaporated milk, it sometimes may be necessary to slightly adjust the milk salt balance, but in general the homogenized cream prepared according to my method may be expected to satisfactorily stand any ordinary or desired sterilizing temperature, because of its richness in milk protein retained from that in the original fresh whole milk. The standardized homogenized cream is now filled in the cans, is sealed, and is then sterilized by a suitable process at a temperature designed to kill all bacteria and heat resistant spores and is then ready for the market.

What I claim is:

1. A process of preserving cream, consisting in homogenizing whole milk at a pressure sufficient to materially reduce the size of the fat globules and thereby produce a stable emulsion with the fat carrying an increased quantity of adsorbed protein, separating the cream from the skim milk, and sterilizing the cream.

2. A process of preserving cream, consisting in pasteurizing and homogenizing fresh whole milk under conditions which materially reduce the size of the fat globules and produce thereby a relatively stable emulsion with the fat carrying an increased quantity of adsorbed protein, separating the cream from the skim milk, and sterilizing the cream.

3. A process of preserving cream, consisting in homogenizing whole milk under conditions which materially reduce the size of the fat globules and thereby produce a substantially stable emulsion with the fat carrying an increased quantity of adsorbed protein, separating the cream from the skim milk, again homogenizing the cream, and sterilizing the cream.

4. A process of preserving cream, consisting in homogenizing whole milk under conditions which materially reduce the size of the fat globules and thereby produce a substantially stable emulsion with the fat carrying an increased quantity of adsorbed protein, separating the cream from the skim milk, again homogenizing the cream, standardizing the cream to a desired fat content, sealing the cream into containers, and sterilizing the cream while in said containers.

In testimony whereof I hereby affix my signature.

ALBERT F. O. GERMANN.